(12) United States Patent
Solhusvik

(10) Patent No.: US 8,599,307 B2
(45) Date of Patent: Dec. 3, 2013

(54) METHOD AND APPARATUS FOR RAPID VERIFICATION OF IMAGING SYSTEMS

(75) Inventor: Johannes Solhusvik, Haslum (NO)

(73) Assignee: Aptina Imaging Corporation, George Town (KY)

( * ) Notice: Subject to any disclaimer, the term of this patent is extended or adjusted under 35 U.S.C. 154(b) by 0 days.

(21) Appl. No.: 13/371,295

(22) Filed: Feb. 10, 2012

(65) Prior Publication Data

US 2013/0027564 A1    Jan. 31, 2013

Related U.S. Application Data

(60) Provisional application No. 61/511,459, filed on Jul. 25, 2011.

(51) Int. Cl.
  *H04N 5/225*  (2006.01)
  *H04N 5/335*  (2011.01)
(52) U.S. Cl.
  USPC .......................................... 348/372; 348/294
(58) Field of Classification Search
  USPC .......................... 348/187, 302, 308, 372, 294
  See application file for complete search history.

(56) References Cited

U.S. PATENT DOCUMENTS

| 5,654,537 | A | 8/1997 | Prater |
| 6,366,312 | B1 | 4/2002 | Crittenden |
| 6,797,933 | B1 | 9/2004 | Mendis et al. |
| 6,958,776 | B2 * | 10/2005 | Mendis et al. ................. 348/308 |
| 7,224,390 | B2 * | 5/2007 | Kokubun et al. .............. 348/308 |
| 8,179,464 | B2 * | 5/2012 | Schemmann et al. ......... 348/308 |
| 2004/0080646 | A1 * | 4/2004 | Zhao et al. ..................... 348/302 |

FOREIGN PATENT DOCUMENTS

EP    1143709    10/2001

* cited by examiner

*Primary Examiner* — Tuan Ho
*Assistant Examiner* — Chan Nguyen
(74) *Attorney, Agent, or Firm* — Treyz Law Group; Louis R. Levenson

(57) ABSTRACT

Imaging systems may be provided with image sensors having verification circuitry. Verification circuitry may be configured to verify proper operation of the image sensor during operation. Verification circuitry may include one or more switchable voltage contacts configured to generate a voltage drop across a power supply network of a pixel array during verification operations. Verification circuitry may include a controllable voltage supply coupled to the power supply network of the pixel array. Verification image data may be generated by applying the voltage drop or by using the controllable voltage supply to supply a different supply voltage to each row of pixels prior to readout of that row. Verification image data may be read out using the same circuitry that is used to readout imaging data. Based on a comparison of the verification data with a predetermined standard, imaging systems may continue to operate normally or corrective action may be taken.

18 Claims, 10 Drawing Sheets

METHOD AND APPARATUS FOR RAPID VERIFICATION OF IMAGING SYSTEMS

This application claims the benefit of provisional patent application No. 61/511,459, filed Jul. 25, 2011, which is hereby incorporated by reference herein in its entirety.

BACKGROUND

This relates generally to imaging devices, and more particularly, to imaging devices with verification circuitry.

Image sensors are commonly used in electronic devices such as cellular telephones, cameras, and computers to capture images. In some situations, it may be desirable to occasionally verify that the components of an image sensor are operating properly before, during, and/or after operation of an electronic device.

It can be difficult to generate repeatable verification signals that test the components of an imaging system. Providing a system or device with a separate and dedicated verification system can add additional cost and complexity to the manufacturing and assembly of the system or device.

It would therefore be desirable to be able to provide improved imaging systems with system verification capabilities.

DETAILED DESCRIPTION

Figure 1:
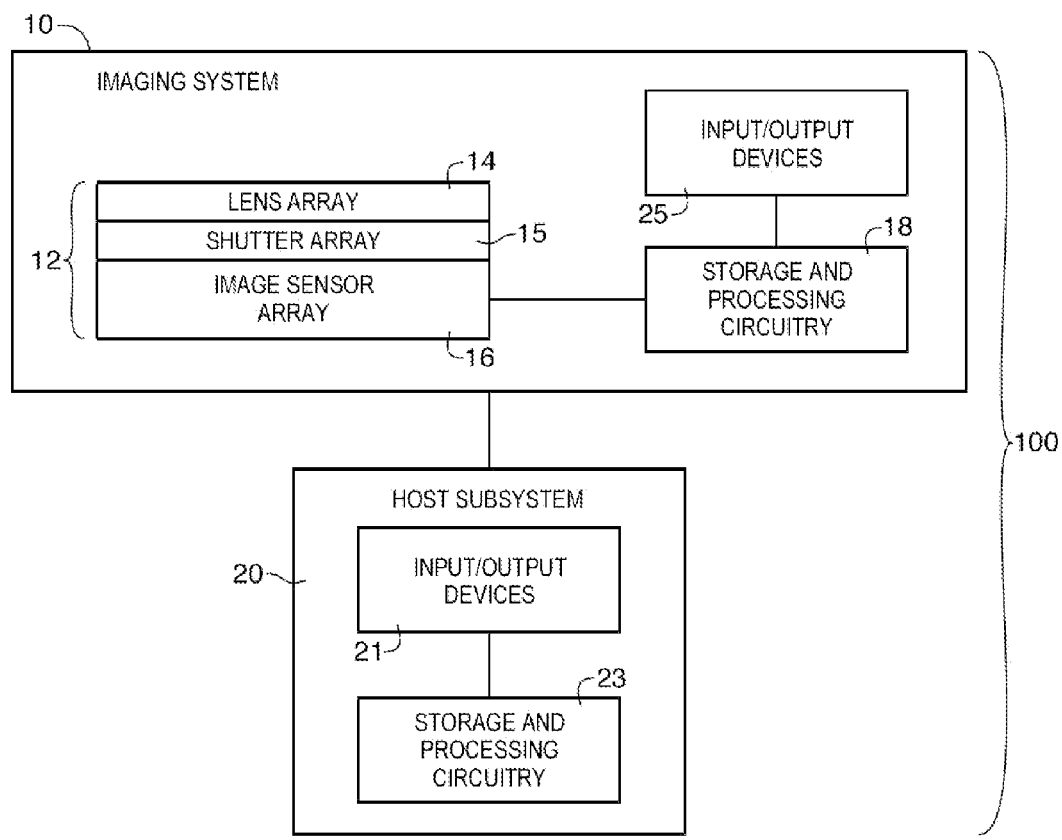
FIG. 1 is a diagram of an illustrative imaging system that contains a camera module with an array of lenses and an array of corresponding image sensors in accordance with an embodiment of the present invention.

Imaging systems having digital camera modules are widely used in electronic devices such as digital cameras, computers, cellular telephones, and other electronic devices. A digital camera module may include one or more image sensors that gather incoming light to capture an image.

In some situations, imaging systems may form a portion of a larger system such as a surveillance system or a safety system for a vehicle (e.g., an automobile, a bus, or any other vehicle). In a vehicle safety system, images captured by the imaging system may be used by the vehicle safety system to determine environmental conditions surrounding the vehicle. As examples, vehicle safety systems may include systems such as a parking assistance system, an automatic or semi-automatic cruise control system, an auto-braking system, a collision avoidance system, a lane keeping system (sometimes referred to as a lane drift avoidance system), etc. In at least some instances, an imaging system may form part of a semi-autonomous or autonomous self-driving vehicle. Such imaging systems may capture images and detect nearby vehicles using those images. If a nearby vehicle is detected in an image, the vehicle safety system may sometimes operate a warning light, a warning alarm, or may operate active braking, active steering, or other active collision avoidance measures. A vehicle safety system may use continuously captured images from an imaging system having a digital camera module to help avoid collisions with objects (e.g., other automobiles or other environmental objects), to help avoid unintended drifting (e.g., crossing lane markers) or to otherwise assist in the safe operation of a vehicle during any normal operation mode of the vehicle.

Vehicle safety standards may require that the proper operation of any component of a vehicle safety system (including imaging system components) be verified before, during, and/or after operation of the vehicle. Verification operations for imaging system components may be performed by an imaging system prior to and/or after operation of a vehicle (e.g., upon startup and/or shutdown of the imaging system). In these verification operations, concurrent operation of the imaging system may not be required. However, it may be desirable to continuously monitor the status of imaging system components during operation of the imaging system, particularly in situations in which vehicle safety may be influenced by the quality of imaging data provided by the imaging system. Imaging systems may be provided having this type of on-the-fly verification capability.

Image sensors may include arrays of image pixels. The pixels in the image sensors may include photosensitive elements such as photodiodes that convert the incoming light into electric charge. Image sensors may have any number of pixels (e.g., hundreds or thousands or more). A typical image sensor may, for example, have hundreds, thousands, or millions of pixels (e.g., megapixels). An image sensor may include verification circuitry for verifying the correct operation of the image sensor. For example, in situations in which images captured by the image sensors are used as input to an active control system for a vehicle, verification circuitry in the image sensor may be configured to generate verification image data and compare the verification image data with an expected result so that incorrect image sensor data is not input into the active control system.

Verification image data may be compared with a predetermined standard stored in the imaging system or stored on additional circuitry that is external to the imaging system. The predetermined standard may be a mathematically determined threshold, may sometimes be referred to as a "golden" standard image, may be captured during manufacturing of the imaging system or at another suitable time (e.g., during startup or shutdown of the imaging system), and may include one or more mathematically or experimentally determined ranges to which verification image data may be compared.

Based on the result of the comparison of the verification image data with the predetermined standard, an imaging system may be disabled (e.g., if the result is outside the predetermined range), may continue to operate normally (e.g., if the result is within the predetermined range). In some arrangements, the imaging system may remain in operation but an indicator may be presented to users to inform the users that the imaging system needs further inspection and/or repair (e.g., the imaging system may present a "check imaging system" indication when the results of verification operations indicate a potential problem in the operation of the imaging system).

FIG. 1 is a diagram of an illustrative imaging and response system including an imaging system that uses an image sensor to capture images. Imaging and response system 100 of FIG. 1 may be a vehicle safety system (e.g., an active braking system, an active steering system, a parking assist system, a collision warning system or other vehicle safety system), may be a surveillance system, or may be an electronic device such as a camera, a cellular telephone, a video camera, or other electronic device that captures digital image data.

As shown in FIG. 1, system 100 may include an imaging system such as imaging system 10 and host subsystems such as host subsystem 20. Imaging system 10 may include camera module 12, control circuitry such as storage and processing circuitry 18 and, if desired, input/output devices such as input/output devices 25.

Camera module 12 may be used to convert incoming light into electric charges and eventually into digital image data. Camera module 12 may include an array of lenses 14 and a corresponding array of image sensors 16. During image capture operations, light from a scene may be focused onto each image sensor in image sensor array 16 using a respective lens in lens array 14. Camera module 12 may include an array of mechanical shutters such as shutter array 15 interposed between lens array 14 and image sensor array 16. Each shutter in shutter array 15 may be alternately closed or opened in order to block light from reaching a corresponding image sensor 16 or allow light to reach the corresponding image sensor 16 respectively. Lenses 14, shutters 15, and image sensors 16 may be mounted in a common package and may provide image data to storage and processing circuitry 18.

Storage and processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured by camera module 12 may be processed and stored using processing circuitry 18. Processed image data may, if desired, be provided to external equipment such as host subsystem 20 using wired and/or wireless communications paths coupled to processing circuitry 18. Circuitry 18 may be configured to operate (e.g., open or close) one or more shutters in shutter array 15.

There may be any suitable number of lenses in lens array 14 and any suitable number of image sensors in image sensor array 16. Lens array 14 may, as an example, include N*M individual lenses arranged in an N×M array. The values of N and M may each be equal or greater than one, may each be equal to or greater than two, may exceed 10, or may have any other suitable values. Image sensor array 16 may contain a corresponding N×M array of individual image sensors. The image sensors of image sensor array 16 may be formed on one or more separate semiconductor substrates. With one suitable arrangement, which is sometimes described herein as an example, the image sensors are formed on a common semiconductor substrate (e.g., a common silicon image sensor integrated circuit die).

Each image sensor may be identical or there may be different types of image sensors in a given image sensor array integrated circuit. Each image sensor may be a Video Graphics Array (VGA) sensor with a resolution of 480×640 sensor pixels (as an example). Other types of sensor pixels may also be used for the image sensors if desired. For example, images sensors with greater than VGA resolution sensor (e.g., high-definition image sensors) or less than VGA resolution may be used, image sensor arrays in which the image sensors are not all identical may be used, etc.

In some modes of operation, all of the sensors on array 16 may be active. In other modes of operation, only a subset of the image sensors may be used. Other sensors may be inactivated to conserve power (e.g., their positive power supply voltage terminals may be taken to a ground voltage or other suitable power-down voltage and their control circuits may be inactivated or bypassed).

Image sensors of image sensor array 16 may be provided with color filters such as red filters, blue filters, and green filters. Each filter may form a color filter layer that covers the image pixels of the image sensor pixel array of a respective image sensor in the array. Other filters such as infrared-blocking filters, filters that block visible light while passing infrared light, ultraviolet-light blocking filters, white color filters, etc. may also be used. In an array with numerous image sensors, some of the image sensors may have red filters, some may have blue color filters, some may have green color filers, some may have patterned color filters (e.g., Bayer pattern filters, etc.), some may have infrared-blocking filters, some may have ultraviolet light blocking filters, or some may be visible-light-blocking-and-infrared-passing filters.

Storage and processing circuitry 18 may convey data (e.g., acquired image data, verification image data, or a result of a verification test) to host subsystem 20. Host subsystem 20 may include an active control system that delivers control signals for controlling vehicle functions such as braking or steering to external devices. Host subsystem 20 may include processing software for detecting objects in images, detecting motion of objects between image frames, determining distances to objects in images, filtering or otherwise processing images provided by imaging system 10. Host subsystem 20 may include a warning system configured to disable imaging system 10 and/or generate a warning (e.g., a warning light on an automobile dashboard, an audible warning or other warning) in the event that verification circuitry associated with one of the image sensors in image sensor array 16 determines that the image sensor is not functioning properly.

If desired, system 100 may provide a user with numerous high-level functions. In a computer or advanced cellular telephone, for example, a user may be provided with the ability to run user applications. To implement these functions, host subsystem 20 and/or imaging system 10 of system 100 may have input/output devices such as input/output devices 25 and 21 respectively. Input/output devices 25 and 21 may include devices such as keypads, input-output ports, joysticks, and displays coupled to storage and processing circuitry 18 and 23 respectively. Storage and processing circuitry 23 of host subsystem 20 may include volatile and nonvolatile memory (e.g., random-access memory, flash memory, hard drives, solid state drives, etc.). Storage and processing circuitry 23 may also include microprocessors, microcontrollers, digital signal processors, application specific integrated circuits, etc.

During operation of imaging system 10, camera module 12 may continuously capture and provide image frames to host subsystems such as host subsystem 20. During image capture operations, verification circuitry associated with one or more of the image sensors of image sensor array 16 may be occasionally operated in a verification mode of operation (e.g., following each image frame capture, following every other image frame capture, following every fifth image frame capture, during a portion of an image frame capture, etc.). Operating the verification circuitry in a verification mode of operation may include applying a plurality of verification voltages to the image pixels of a pixel array. Images captured when verification circuitry is operated may include verification image data containing verification information. Verification image data may be provided to storage and processing circuitry 18 and/or storage and processing circuitry 23. Storage and processing circuitry 18 may be configured to compare the verification image data to a predetermined standard data set stored on storage and processing circuitry 18. Following the comparison, storage and processing circuitry 18 may send status information (e.g., the result of the comparison, or a coded fault signal) or other verification information to host subsystem 20.

Figure 2:
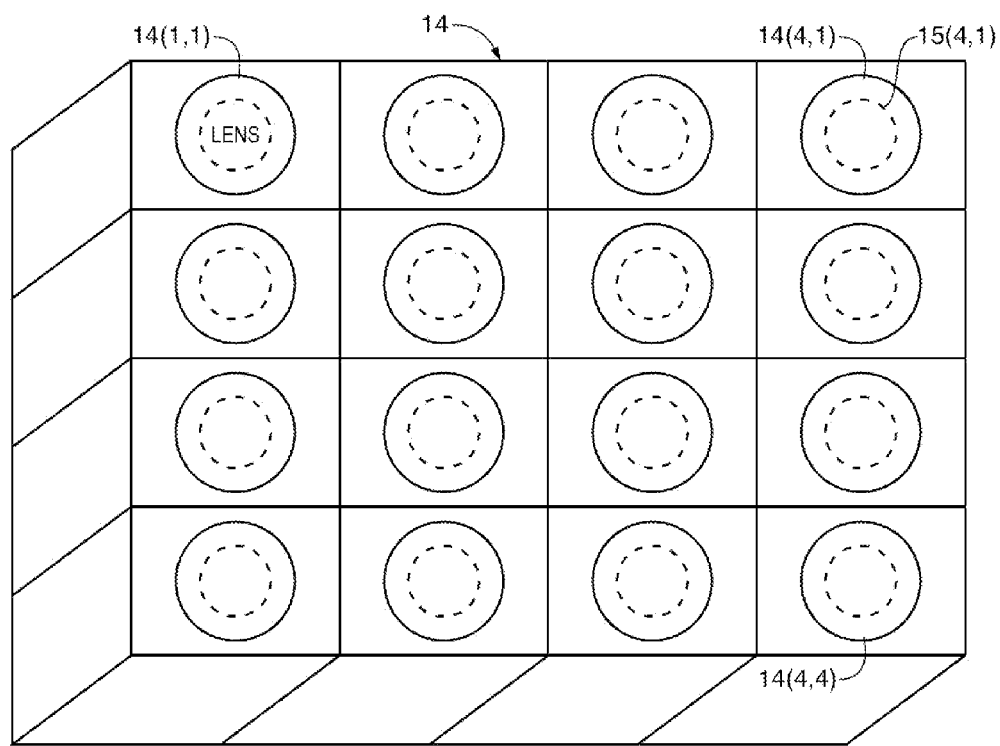
FIG. 2 is a perspective view of an illustrative camera module having an array of lenses in accordance with an embodiment of the present invention.

FIG. 2 is a perspective view of an illustrative camera module having an array 14 of lenses (e.g., lenses such as lenses 14(1,1), 14(4,1) and 14(4,4)). The array of lenses may, for example, be a rectangular array having rows and columns of lenses. The lenses may all be equally spaced from one another or may have different spacings. There may be any suitable number of lenses 14 in the array. In the FIG. 2 example, there are four rows and four columns of lenses. Each lens may have an associated shutter in shutter array 15 (e.g., mechanical shutters such as shutter 15(4,1)).

Figure 3:
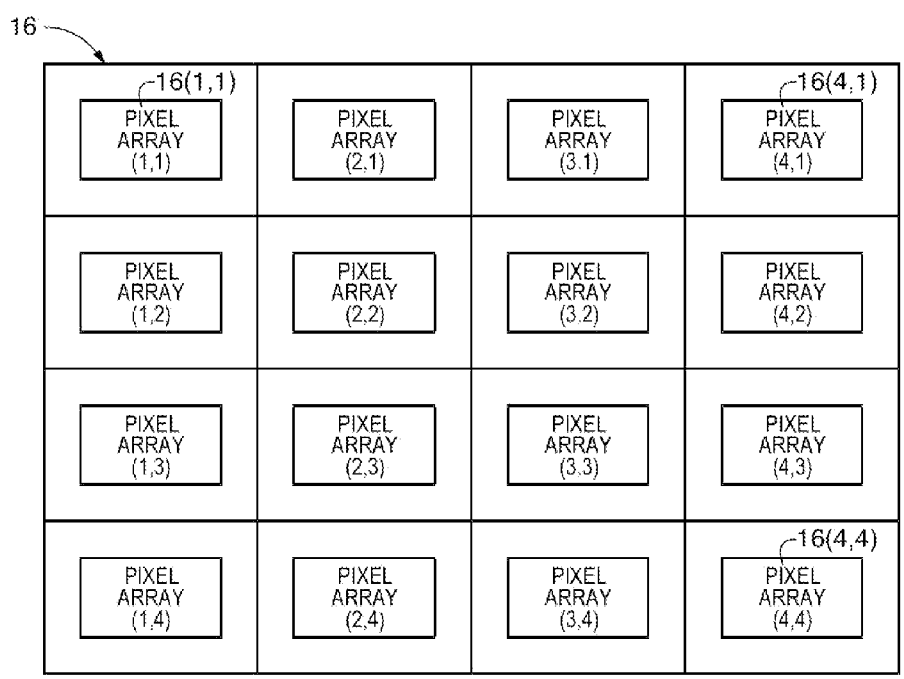
FIG. 3 is a diagram of an illustrative sensor array of the type that may be used with the lens array of FIG. 2 in a camera module in accordance with an embodiment of the present invention.

An illustrative sensor array of the type that may be used with the lens array of FIG. 2 is shown in FIG. 3. As shown in FIG. 3 sensor array 16 may include image sensors such as sensor 16(1,1), 16(4,1), and 16(4,4). The array of FIG. 3 has sixteen image sensors, but, in general, array 16 may have any suitable number of image sensors (e.g., on image sensor, two or more sensors, four or more sensors, ten or more sensors, 20 or more sensors, etc.).

Figure 4:
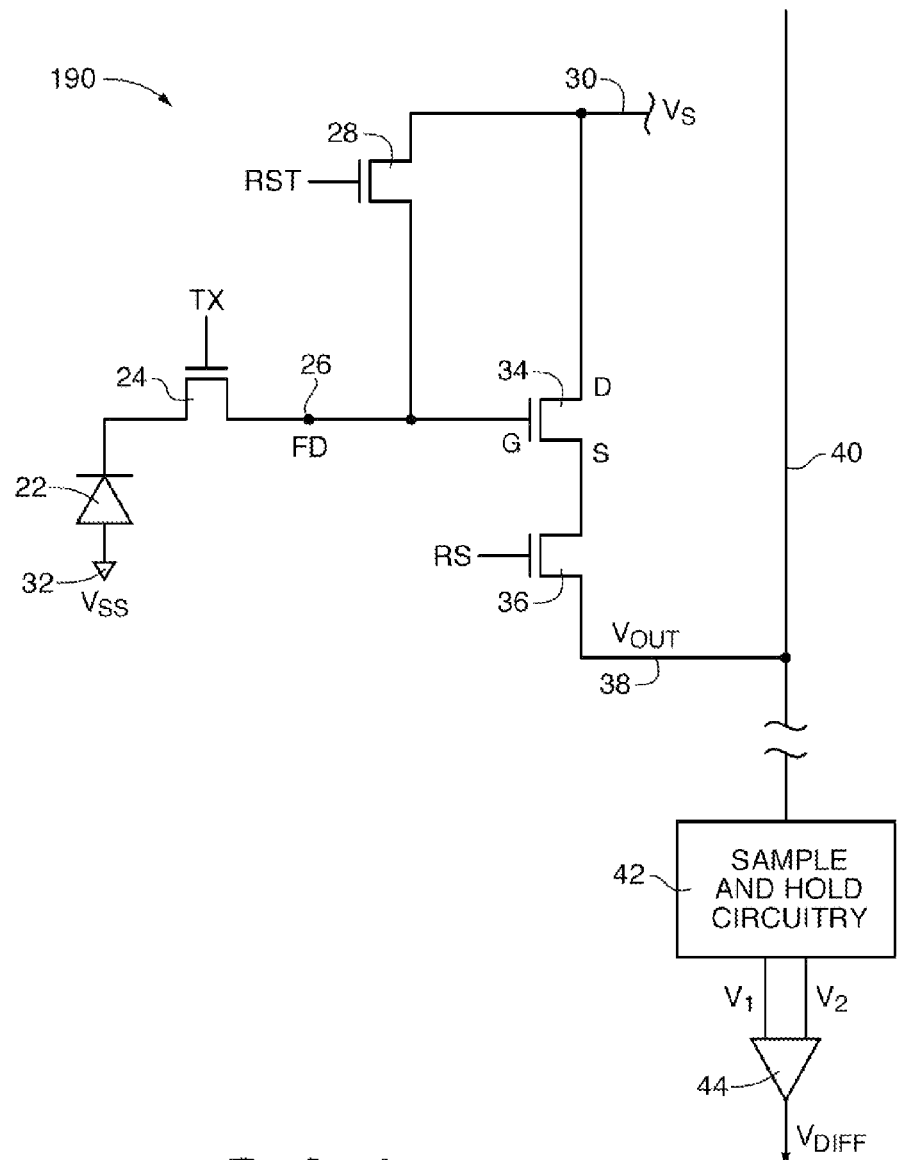
FIG. 4 is a diagram of an illustrative image sensor pixel in accordance with an embodiment of the present invention.

Circuitry in an illustrative pixel of one of the image sensors in sensor array 16 is shown in FIG. 4. As shown in FIG. 4, pixel 190 may include one or more photosensitive elements such as photodiode 22. A supply voltage VS may be supplied as power supply terminal 30. During normal operation of pixels such as pixel 190, power supply terminal 30 may be coupled to a positive power supply voltage Vaa for resetting floating diffusion FD and photodiode 22 to Vaa. A ground power supply voltage (e.g., Vss) may be supplied at ground terminal 32. However, during verification operations, supply voltage VS may be supplied by verification circuitry such as a switchable or variable voltage supply (e.g., by switchably coupling terminal 30 to one or more different power pads or by coupling terminal 30 to a controllable voltage supply circuit). Supply terminal 30 may be directly coupled to verification circuitry or circuitry associated with other pixels may be interposed between terminal 30 of pixel 190 and verification circuitry.

During verification operations, supply voltage VS may be power supply voltage Vaa, may be ground supply voltage Vss or may be an intermediate voltage between power supply voltage Vaa and ground supply voltage Vss. During verification operations, supply voltage VS may vary from pixel to pixel.

During normal operation of pixel 190 (i.e., during image capture operations), terminal 30 may be supplied with a positive power supply voltage Vaa and incoming light may be collected by photodiode 22 after passing through a color filter structure. Photodiode 22 converts the light to electrical charge.

Before an image is acquired, reset control signal RST may be asserted. This turns on reset transistor 28 and resets charge storage node 26 (also referred to as floating diffusion FD) to Vaa. The reset control signal RST may then be deasserted to turn off reset transistor 28. A source-follower transistor such a source-follower transistor 34 may receive the reset voltage (e.g., Vaa). In some modes of operation a reset signal may be readout from the source-follower transistor (e.g., in a correlated double sampling readout of pixel 190). After the reset process is complete, transfer gate control signal TX may be asserted to turn on transfer transistor (transfer gate) 24 and initiate readout operations for imaging data. When transfer transistor 24 is turned on, the charge that has been generated by photodiode 22 in response to incoming light is transferred to charge storage node 26.

Charge storage node 26 may be implemented using a region of doped semiconductor (e.g., a doped silicon region formed in a silicon substrate by ion implantation, impurity diffusion, or other doping techniques). The doped semiconductor region (i.e., the floating diffusion FD) exhibits a capacitance that can be used to store the charge that has been transferred from photodiode 22. The signal associated with the stored charge on node 26 is conveyed to row select transistor 36 by source-follower transistor 34.

When it is desired to read out the value of the stored charge (i.e., the value of the stored charge that is represented by the signal at the source S of transistor 34), row select control signal RS can be asserted. When signal RS is asserted, transistor 36 turns on and a corresponding signal $V_{OUT}$ that is representative of the magnitude of the charge on charge storage node 26 is produced on output path 38. $V_{OUT}$ may represent a voltage corresponding to a charge generated by incoming light on photodiode 22, a reset voltage (e.g., for a correlated-double-sampling (CDS) readout of pixel 190), a verification voltage corresponding to an intermediate supply voltage supplied to pixel 190 by verification circuitry, or other voltage.

A vertical conductive path such as path 40 can be associated with each column of pixels. When signal RS is asserted in a given row, path 40 can be used to route signal $V_{OUT}$ from pixels in that row to column readout circuitry. If desired, column readout circuitry may include circuitry such as sample and hold circuitry 42. Sample and hold circuitry 42 may be configured to read and store signals such as signals $V_1$ and $V_2$ (e.g., a voltage corresponding to a pixel reset and a voltage corresponding to integrated charge transferred from the photodiode) from each pixel 190. Signals $V_1$ and $V_2$ may be provided to a differential amplifier such as amplifier 44 in order to provide a differential signal $V_{DIFF}$ to storage and processing circuitry 18 (see FIG. 1). $V_{DIFF}$ may, for example, correspond to the difference between a voltage on pixel 190 corresponding to positive power supply voltage Vaa (i.e., a reset voltage) and a voltage on pixel 190 corresponding to a signal voltage (e.g., an image signal voltage or verification image signal voltage).

If desired, other types of image pixel circuitry may be used to implement the image pixels of sensors array 16. For example, each image sensor pixel 190 may be a three-transistor pixel, a pin-photodiode pixel with four transistors, a global shutter pixel, a time-of-flight pixel, etc. The circuitry of FIG. 2 is merely illustrative.

In a typical configuration, there are numerous rows and columns of pixels such as pixel 190 in the image sensor pixel array of a given image sensor. Generally the power supply terminals 30 of pixels 190 in an image sensor pixels array are coupled to a common power supply network (e.g., metal power supply circuitry coupled to each terminal 30 so that a positive power supply voltage Vaa applied to the power supply circuitry of the pixel array is supplied to all pixels 190).

Figure 5:
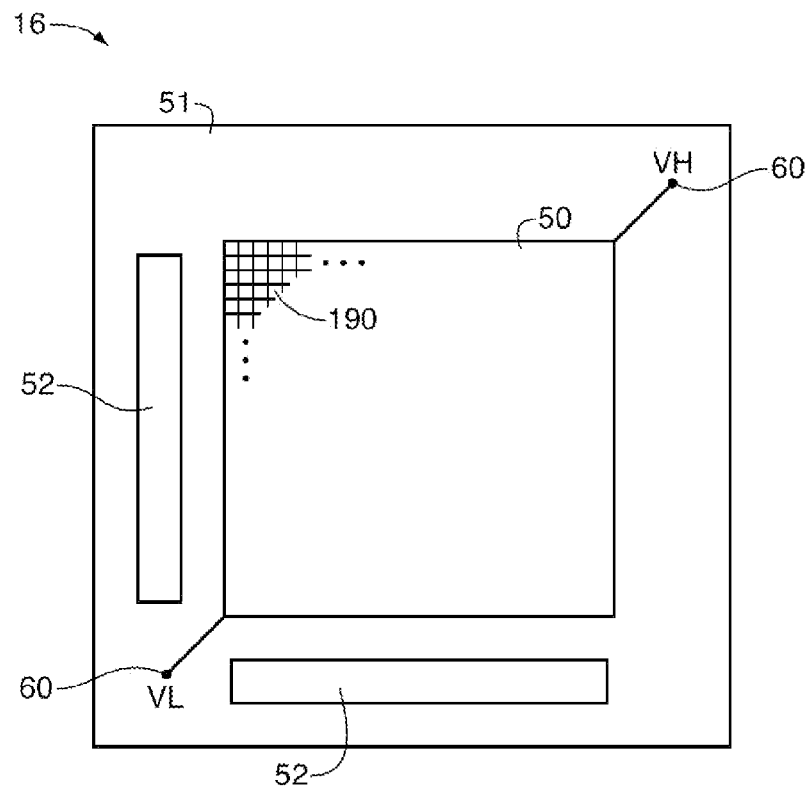
FIG. 5 is a top view of an illustrative image sensor having an image pixel array and verification circuitry in accordance with an embodiment of the present invention.

As shown in FIG. 5 an image sensor such as image sensor 16 may include an array of pixels and verification circuitry for generating a voltage gradient across the pixel array. Image sensor 16 may include an array of image pixels such as pixel array 50 having a multiple image pixels 190 formed on a substrate 51 (e.g., a silicon image sensor integrated circuit die). Image sensor 16 may include verification circuitry such as power supply contacts 60 formed on the substrate. Image sensor 16 may include control circuitry such as control circuitry 52 for operating pixels 190 and verification circuitry 60.

Control circuitry 52 may include row control circuitry, bias circuitry (e.g., source follower load circuits), sample and hold circuitry, correlated double sampling (CDS) circuitry, amplifier circuitry, analog-to-digital (ADC) converter circuitry, data output circuitry, memory (e.g., buffer circuitry), address circuitry, etc. Control circuitry 52 may be formed entirely on substrate 51 or may be formed, in part, or entirely on an additional integrated circuit die.

Power supply contacts 60 may be connected to the power supply circuitry of pixel array 50 (e.g., directly or indirectly coupled to the power supply terminals 30 of pixels 190). During normal operation (i.e., image capture operations) of image sensor 16, power supply contacts 60 may each be coupled to a common positive power supply voltage (e.g., Vaa). During verification operations, a selected one of power supply contacts 60 may be coupled to a first voltage VH while a second one of power supply contacts 60 may be coupled to a second voltage VL that is different from first voltage VH.

A voltage that depends on first and second voltages VH and VL may, for example, be placed on a storage region (e.g., floating diffusion regions FD) of each pixel 190 by globally asserting reset signal RST to turn on reset transistors 28. If desired, a voltage that depends on first and second voltages VH and VL may be placed on a photodiodes 22 of each pixel 190 by globally asserting reset signal RST and transfer signal TX to turn on reset transistors 28 and transfer transistors 24 of pixels 190.

Figure 6:
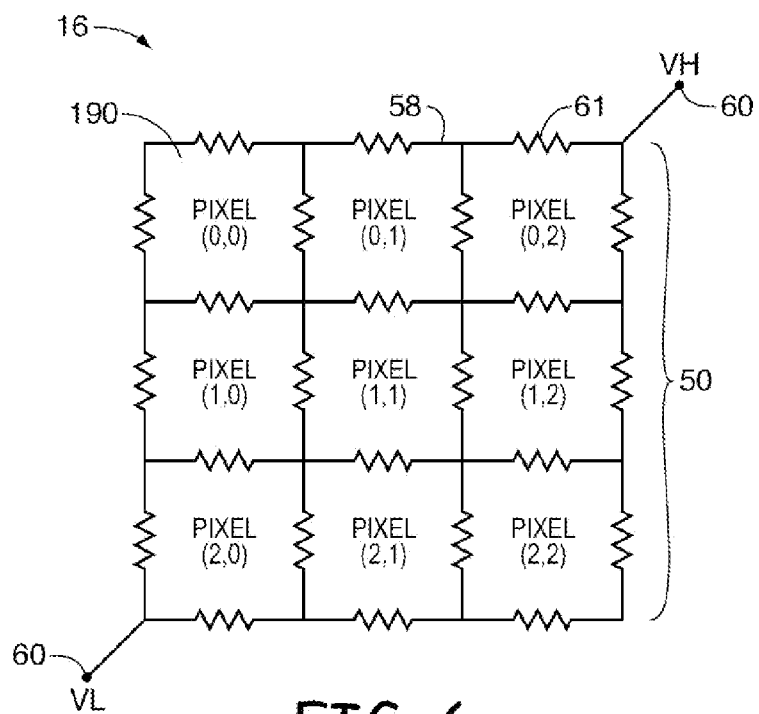
FIG. 6 is a diagram of illustrative power supply circuitry coupled to verification circuitry of the type shown in FIG. 5 in accordance with an embodiment of the present invention.

As shown in FIG. 6, power supply paths such as power supply circuitry 58 associated with pixels 190 may provide a resistance between voltage VH and voltage VL. Power supply circuitry may include one or more resistive elements. However, resistors such as resistor 61 represented in FIG. 6 are merely illustrative. Power supply paths 58 may provide an overall resistance simply due to the complexity of circuitry associated with power supply paths 58 and pixels 190 interposed between voltage VH and voltage VL (e.g., due to the network of conductive paths over which current may flow between contacts 60). Because of this resistance of the power supply circuitry of pixel array 50, the photodiode of each pixel 190 in pixel array 50 may be provided with a different amount of charge. For example, power supply circuitry 58 that is coupled to first and second voltages VH and VL may be provided with a voltage gradient across the pixel array (i.e., those pixels closer to a higher voltage such as VH may have a relatively higher voltage on floating diffusion FD while pixel closer to a lower voltage such as VL may have a relatively lower voltage on floating diffusion FD). In this way, a repeatable and reliable verification "image" having a signal gradient may be placed on pixels 190 of pixel array 50 without requiring any integration of charge.

In one configuration that is sometimes discussed herein as an example, during verification operations, voltage VH may be supply voltage Vaa (e.g., a voltage that, if directly supplied to a pixel, will fully deplete the photodiode of charges) while voltage VL may be a ground supply voltage such as voltage Vss. In this configuration, supply levels of all pixels except for the pixel coupled directly to supply voltage Vaa (e.g., top right pixel(0,2) of FIG. 6), will be below Vaa due to the resistance of power supply circuitry 58. Photodiodes 22 of these pixels will therefore have some remaining charge. The pixel that is directly coupled to ground voltage VL (e.g., lower left corner pixel(2,0) of FIG. 6) will be filled up with charges (sometimes referred to as flushed). The pixel that is directly coupled to voltage VH (e.g., upper right corner pixel(0,2) of FIG. 6) will be fully depleted of charge since its photodiode is reset to Vaa (similar to a regular reset operation). When reading out the verification image data, lower left pixel (2,0) will have the equivalent of a bright (saturated) image signal, and the upper right pixel (0,2) will have the equivalent of a dark (black) image signal. All other pixels 190 in the rest of array 50 will be have the equivalent of an intermediate (grey) image signal. Repeatable verification image data may be generated at any time during operation of imaging system 100 by setting voltages VH and VL to supply voltage Vaa and ground voltage Vss respectively. However, this is merely illustrative. In general, voltages VH and VL may be set to any suitable voltages such that, during verification operations, a repeatable, non-uniform distribution of voltages is supplied to pixels 190 of pixel array 50.

Figure 7:
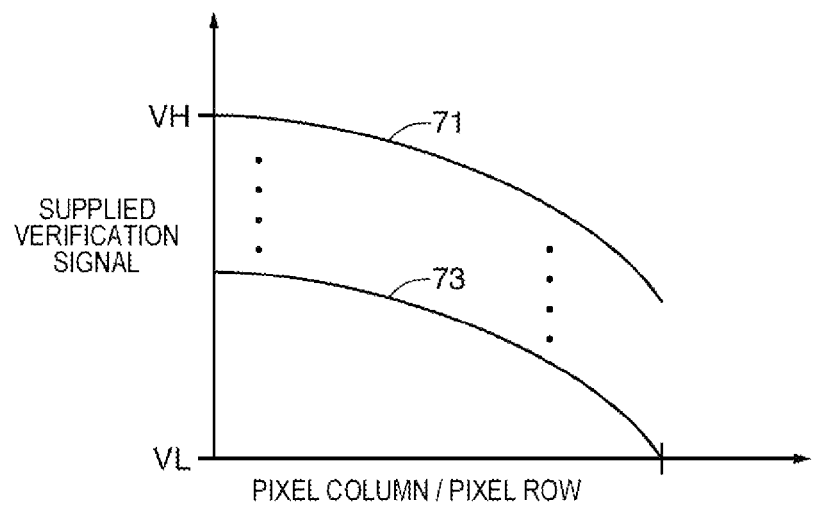
FIG. 7 is a graph showing how verification circuitry of the type shown in FIG. 5 may generate a non-uniform distribution of pixel verification signals across an image pixel array in accordance with an embodiment of the present invention.

As shown in FIG. 7, the verification signal supplied to each pixel 190 of pixel array 50 in response to voltages VH and VL that are different may vary with the position of a given pixel 190 in array 50. For example, curve 71 may represent voltages supplied to pixels in a common row or column of pixels that includes pixel (0,2) of FIG. 6 (e.g., the pixel that is directly connected to contact 60 having a voltage VH). As another example, curve 73 may represent voltages supplied to pixels in a common row or column of pixels that includes pixel (2,0) of FIG. 6 (e.g., the pixel that is directly connected to contact 60 having a voltage VL). Other pixels may be supplied with other voltages between voltage VL and voltage VH.

A verification image signal generated by setting voltages VH and VL to different values may be supplied to, and read from, pixels 190 of pixel array 50, for example, between capturing image frames, after capturing a selected number of image frames, during an image frame (e.g., during a vertical blanking interval or horizontal blanking interval of an image readout operation) or at any other suitable interval. Voltages such as voltages VH and VL may be rapidly applied and removed from supply circuitry 58 of pixel array 50 (e.g., in a relatively short time period compared with the time required to integrate charges on photodiodes 22 during imaging operations). If desired, a portion of a verification image may therefore be captured by supplying verification voltages to generate a signal gradient across pixel array 50 and reading out selected rows of image pixels 190 during, for example, a vertical blanking interval of each image frame. In this way, a fraction 1/P of a verification image may be generated following each frame and a full verification image may be generated following each group of P frames where P is any number greater than one.

Verification signals on pixels 190 generated in response to voltages VH and VL applied to the power supply network (power supply circuitry) of pixel array 50 may be read out using circuitry associated with pixel 190 and circuitry 52 in the same way that image signals generated by incoming light are commonly read out. In this way, verification image data generated by verification circuitry 60 may be processed by imaging system 10 in the same manner as image charges, thereby operating the elements of pixels 190, circuitry 52 and circuitry 18 for verification purposes. Thus, many possible failure modes of the imaging system 10 can be detected (e.g., failure in components of pixels 190, control circuitry 52, analog sub-circuitry, analog-to-digital conversion circuitry, row decoder circuitry, column decoder circuitry, boosters, amplifiers, digital data processing, etc.).

In the example of FIG. 5, image sensor 16 includes two contacts 60 coupled to opposing corners of pixel array 50. However, this is merely illustrative. If desired, image sensor 16 may have one contact 60, two contacts 60, three contacts 60, or more than three contacts 60. Contacts 60 may be selectively coupled to various voltage supplies using circuitry 52 or circuitry 18 (see FIG. 1). Contacts 60 may be connected to power supply network 58 at corners of pixel array 50 or at any other suitable location on power supply network 58.

Figure 8:
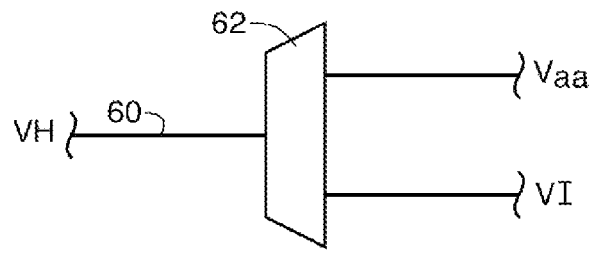
FIG. 8 is a diagram of an illustrative switchable voltage supply circuit of the type shown in FIG. 5 in accordance with an embodiment of the present invention.
Figure 9:
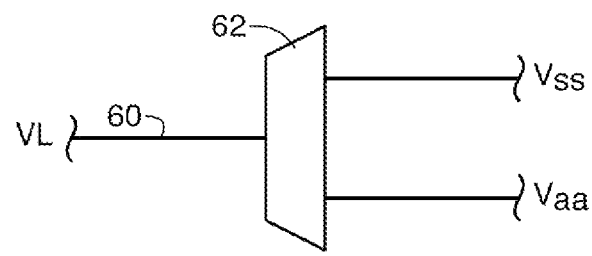
FIG. 9 is a diagram of an illustrative switchable voltage supply circuit of the type shown in FIG. 5 in accordance with an embodiment of the present invention.

Contacts 60 may be switchably coupled between power supply circuitry 58 and one or more power pads or may be coupled between power supply circuitry 58 and a variable (controllable) voltage supply component. As shown in FIGS. 8 and 9, contacts 60 of FIG. 5 may be switchably coupled to various supply voltages using a multiplexer.

As shown in FIG. 8, a power supply contact 60 for supplying first voltage VH to pixel power supply circuitry 58 may include a multiplexer such as multiplexer 62 that is coupled to supply voltage Vaa and an intermediate voltage V1 having a value between power supply voltage Vaa and a ground voltage. In this way, voltage VH may be switched (using multiplexer 62) between supply voltage Vaa (e.g., during imaging operations) and intermediate voltage V1 (e.g., during verification operations). However, this is merely illustrative. Power supply contact 60 may be coupled to supply voltage Vaa during both imaging operations and verification operations.

As shown in FIG. 9, a power supply contact 60 for supplying second voltage VL to pixel power supply circuitry 58 may include a multiplexer such as multiplexer 62 that is coupled to supply voltage Vaa and a ground supply voltage Vss. In this way, voltage VL may be switched (using multiplexer 62) between supply voltage Vaa (e.g., during imaging operations) and ground supply voltage Vss (e.g., during verification operations). As described above in connection with FIGS. 5 and 6, during imaging operations, both voltage VH and voltage VL may be equal to power supply voltage Vaa and during verification operations, voltage VH may remain equal to supply voltage Vaa while voltage VL may be switched (e.g., using multiplexer 62) to a ground voltage such as ground supply voltage Vss.

Figure 10:
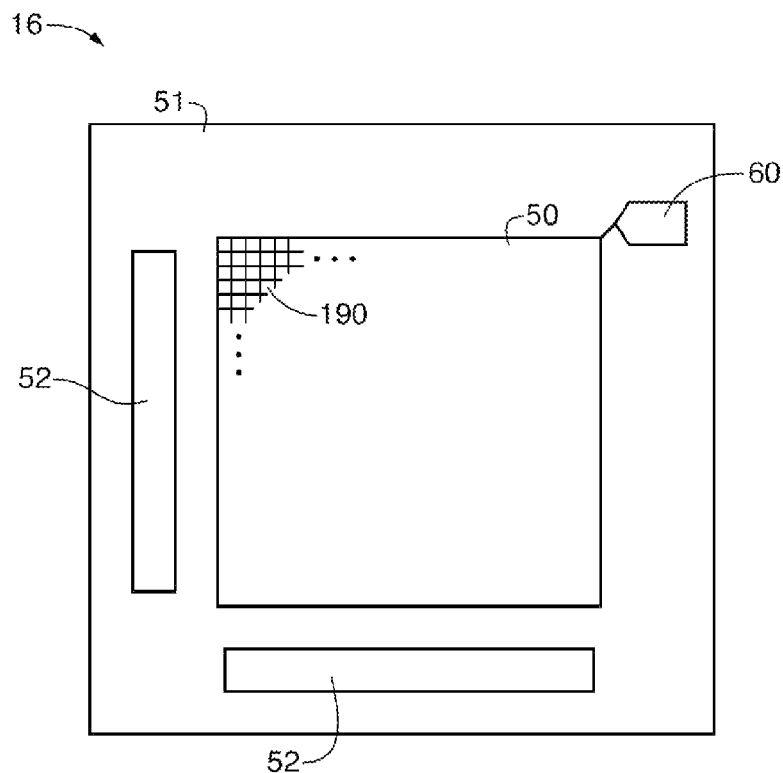
FIG. 10 is a top view of an illustrative image sensor having an image pixel array and verification circuitry having a variable voltage supply in accordance with an embodiment of the present invention.

The configuration of verification circuitry 60 of FIGS. 5, 6, 8, and 9 is merely illustrative. If desired, verification circuitry 60 may include a controllable, variable voltage supply circuit as shown in FIG. 10. In the example of FIG. 10, controllable voltage supply 60 may be coupled to pixel array 50 on substrate 51. Controllable voltage supply 60 may be configured to supply a positive power supply voltage (e.g., Vaa) to pixel array 50 during imaging operations of image sensor 16 and one or more intermediate voltages to pixel array 50 during verification operations.

Figure 11:
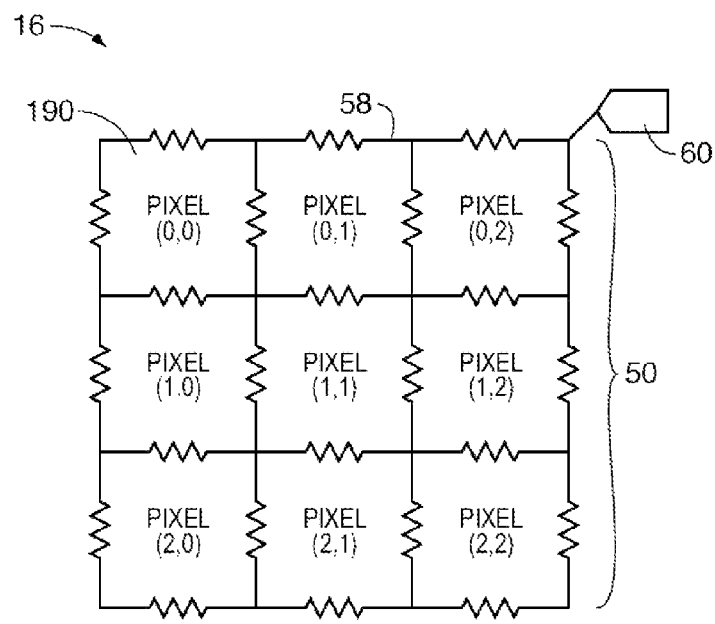
FIG. 11 is a diagram of illustrative power supply circuitry coupled to verification circuitry of the type shown in FIG. 10 in accordance with an embodiment of the present invention.

As shown in FIG. 11, verification circuitry such as controllable voltage supply 60 may be coupled to power supply circuitry 58 of pixel array 50. In the example of FIGS. 10 and 11, all pixels 190 of pixel array 50 may be supplied with a common voltage by controllable voltage supply 60 at any given time. In this way, current flow in power circuitry 58 may be avoided. A first verification signal may be placed on pixels 190 of pixels array 50 by applying a first voltage to power supply circuitry (power supply network) 58 and operating a transfer transistor such as transfer transistor 24 and a reset transistor such as reset transistor 28 of each pixel 190. Once the first voltage has been supplied to pixels 190 using circuitry 60, a first row pixels 190 in pixel array 50 may be read out from pixels 190 using control circuitry 52. Later, subsequent, different voltages (using circuitry 60) may be applied to power supply circuitry 58 and reading out a subsequent row of pixels in pixel array 50 may be read out while each subsequent voltage is applied to power supply circuitry 58. The voltage supplied by verification circuitry 60 to power supply circuitry 58 may be different during readout each row. In this way, each row of pixels in pixel array 50 may generate a different verification signal without causing current to flow through power supply circuitry 58.

Figure 12:
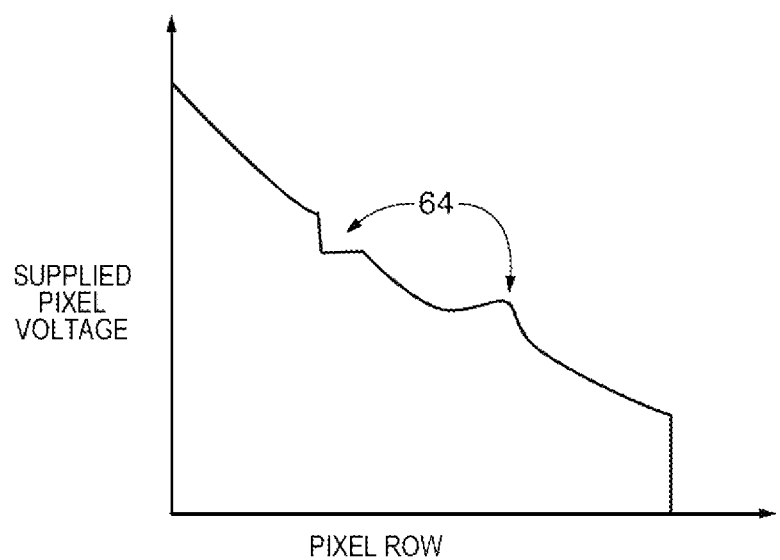
FIG. 12 is a graph showing how verification circuitry of the type shown in FIG. 9 may generate a non-uniform distribution of pixel intensities across an image pixel array in accordance with an embodiment of the present invention.

As shown in FIG. 12, each row of pixels in pixel array 50 may be read out using control circuitry 52 while power supply circuitry 58 is supplied with a different supply voltage from circuitry 60 in order to create a signal gradient from the top of pixel array 50 to the bottom of pixel array 50. Because circuitry 60 is controllable, a smooth voltage gradient may be supplied or a gradient with features such as features 64 may be applied (e.g., by non-uniformly raising and lowering the voltage supplied by circuitry 60 during readout of pixels 190). Circuitry 60 that generates signal features 64 may generate a less uniform signal pattern across pixel array 50 for verification operations.

Verification signals that have been placed on pixels 190 using a controllable variable voltage supply circuit may be read out using circuitry associated with pixel 190 and circuitry 52 in the same way that image signals generated by incoming light are commonly read out. In this way, verification image data generated by verification circuitry 60 may be processed by imaging system 10 in the same manner as image charges are processed, thereby operating the elements of pixels 190, circuitry 52 and circuitry 18 for verification purposes. Thus, many possible failure modes of the imaging system 10 can be detected (e.g., failure in components of pixels 190, control circuitry 52, analog sub-circuitry, analog-to-digital conversion circuitry, row decoder circuitry, column decoder circuitry, boosters, amplifiers, digital data processing, etc.).

A verification image signal may be supplied to pixels 190 using a controllable voltage supply such as controllable voltage supply 60 and may be read from rows of pixels 190 in pixel array 50, for example, between capturing image frames, after capturing a selected number of image frames, during an image frame (e.g., during a vertical blanking interval or horizontal blanking interval of an image readout operation) or at any other suitable interval. Selected voltages may be rapidly applied to and removed from supply circuitry 58 of pixel array 50 using circuitry 60 (e.g., in a relatively short time period compared with the time required to integrate charges on photodiodes 22). If desired, a portion of a verification image may therefore be captured by applying voltages and reading out rows of pixels in pixel array 50 during, for example, a vertical blanking interval of each image frame. In this way, a fraction 1/P of a verification image may be generated following each frame and a full verification image may be generated following each group of P frames.

Verification image data generated using verification circuitry such as controllable voltage supply 60 may be compared to a predetermined standard following readout of the verification image data to, for example, storage and processing circuitry 18. The predetermined standard may be data stored on circuitry 18. Predetermined standard data may include a "golden" standard verification image (e.g., captured during manufacturing of imaging system 10 or at startup of imaging system 10) generated by operating verification circuitry 60 and capturing the standard image using image pixels 190. The result of the comparison may be processed by circuitry 18 of imaging system 10 or may be provided to host subsystem 20. If the result of the comparison falls within a predetermined range of values, imaging system 10 may continue to operate normally. If the result of the comparison falls outside the predetermined range of values, the host subsystem 20 may be configured to disable some or all of imaging system 10 and/or, if desired, issue a warning to the operator of imaging system 10 (e.g., the driver of an automobile including system 100).

The example of a "golden" standard image is merely illustrative. If desired, the predetermined standard may include verification image data captured during a previous operation of verification circuitry 60, may include a mathematical predicted value for verification image signal values for some or all pixels 190 of pixel array 50 (e.g., based on known properties of substrate 51, power supply circuitry 58, verification circuitry 60, and pixels 190), may include a statistical range of pixel values, or may include other suitable standard data for verifying proper operation.

If desired, verification image data generated using a controllable voltage supply circuit may be processed by storage and processing circuitry 18 prior to comparison of the verification image data with the predetermined standard. For example, storage and processing circuitry 18 may be configured to apply filtering such as noise filtering to the verification image data (e.g., time-domain filtering, frequency-domain filtering, or spatial filtering of stored verification images). Applying a noise filter to the verification image data prior to comparison with the predetermined standard may help improve the reliability and simplicity of the comparison with the predetermined standard.

Figure 13:
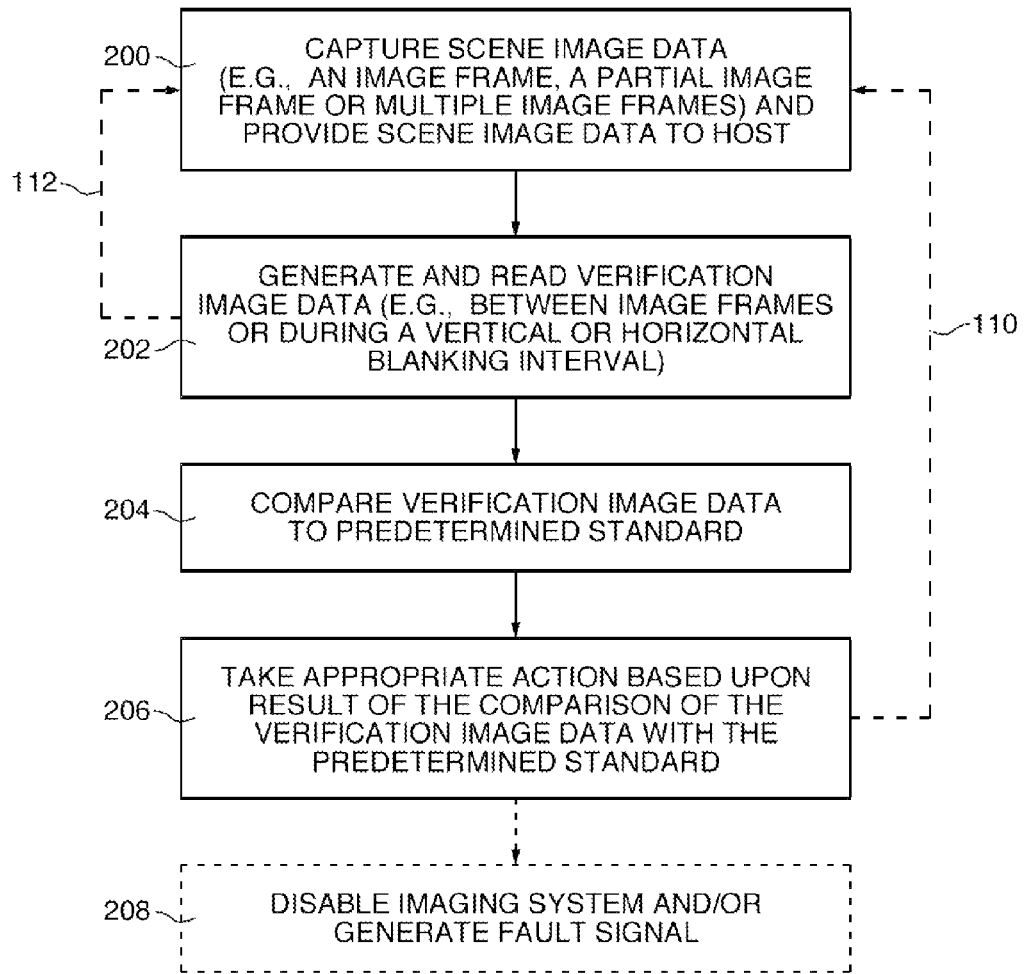
FIG. 13 is a flowchart of illustrative steps that may be used for continuous on-the-fly verification of imaging systems of the type shown in FIG. 1 in accordance with an embodiment of the present invention.

FIG. 13 is a flowchart showing illustrative steps that may be used in operating a system such as an imaging and response system of the type shown in FIG. 1.

At step 200, an imaging system such as imaging system 10 of FIG. 1 may be used to capture scene-image data such as one or more image frames or a portion of an image frame. Some or all of the captured scene-image data may be provided to a host such as host subsystem 20 of FIG. 1. During capture of the scene-image data, a positive power supply voltage may be supplied to all pixels of a pixel array associated with imaging system 10. If desired, scene-image data may be processed using processing circuitry such as storage and processing circuitry 18 to process the image frames prior to delivery to host subsystem 20. If desired, image frames may be continuously captured, processed, and provided to host 20 (e.g., as part of a vehicle safety system such as an active control system).

At step 202, in order to verify proper operation of components of imaging system 10, imaging system 10 may be used to generate and readout (read) verification image data. Verification image data may be generated, in part, by changing the power supply voltage to some or all of the power supply circuitry of the pixel array. In some configurations, only a portion of a verification image may be generated and read at step 202 (e.g., verification image data for a selected number of rows may be generated and readout during the vertical blanking interval at the end of each scene-image-frame capture). In situations in which only a portion of a verification image is generated at step 202, system 100 may return to step 200 (as indicated by dashed line 112) and capture additional scene-image data before returning to step 202 and generating and reading additional verification image data.

At step 204, the verification image data may be compared to a predetermined standard such as a "golden" standard image or a mathematically or experimentally determined threshold or range.

At step 206, system 100 may take appropriate action based on the result of the comparison of the verification image data with the predetermined standard. If the verification data is determined to be within a tolerable range of the predetermined standard, system 100 may return to step 200 (as indicated by dashed line 110) and resume the cycle of image capture and imaging system verification during the remaining operation of system 100. If the verification data is determined to be outside the tolerable range of the predetermined standard, system 100 may progress to step 208.

At optional step 208, host subsystem 20 may disable some or all of imaging system 10 and, if desired, generate a fault signal. Imaging system 10 or host subsystem 20 may generate a response to the fault signal such as an audible or visible failure alert signal for an operator of system 100 (e.g., an operator of a vehicle including a vehicle safety system such as system 100). In some arrangements, imaging system 10 may remain in operation but an indicator may be presented to the operator to inform the operator that the imaging system needs further inspection and/or repair (e.g., the imaging system may present a "check imaging system" indication when the results of verification operations indicate a potential problem in the operation of the imaging system).

Figure 14:
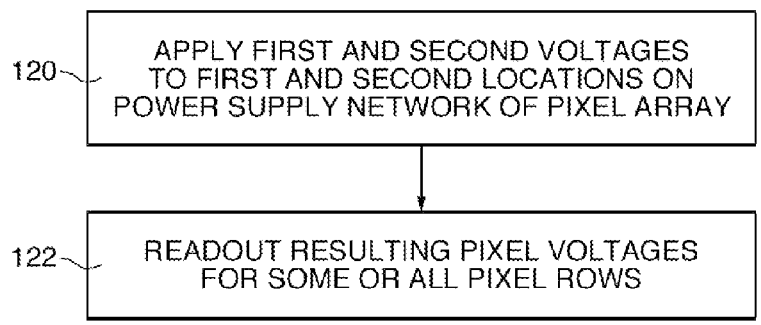
FIG. 14 is a flowchart of illustrative steps that may be used in capturing and reading verification image data using an image sensor of the type shown in FIG. 5 in accordance with an embodiment of the present invention.

FIG. 14 is a flowchart showing illustrative steps that may be used in generating and reading verification image data as described above in connection with step 202 of FIG. 13 using verification circuitry of the type shown in FIG. 5.

At step 120, first and second voltages may be applied to first and second locations on a power supply network such as power supply circuitry 58 of a pixel array such as pixel array 50 of FIG. 5. One or more pixels may be interposed between the first and second locations. The first voltage may be higher than the second voltage.

At step 122, resulting verification image signal values generated by the application of the first and second voltages to the first and second locations may be read out from each pixel 190 of some or all rows of pixel array 50 and may be and provided to storage and processing circuitry 18.

Figure 15:
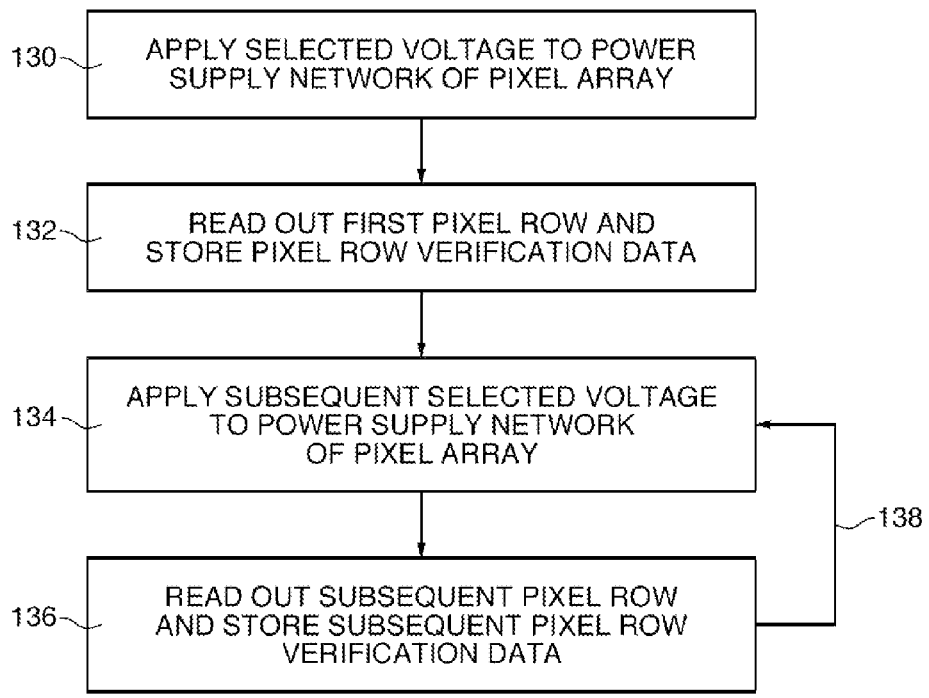
FIG. 15 is a flowchart of illustrative steps that may be used in capturing and reading verification image data using an image sensor of the type shown in FIG. 10 in accordance with an embodiment of the present invention.

FIG. 15 is a flowchart showing illustrative steps that may be used in generating and reading verification image data as described above in connection with step 202 of FIG. 13 using verification circuitry of the type shown in FIG. 10.

At step 130, verification circuitry such as controllable voltage supply circuit 60 of FIG. 10 may be used to apply a selected voltage to a power supply network such as power supply circuitry 58 of pixel array 50.

At step 132, verification image signal values resulting from the application of the selected voltage may be read out from a first row of pixels in pixel array 50.

At step 134, verification circuitry such as controllable voltage supply circuit 60 may be used to apply a subsequent selected voltage to power supply circuitry 58 of pixel array 50. The subsequent selected voltage may be the same as the selected voltage applied at step 130 or may be different from the selected voltage applied at step 130.

At step 136, verification image signal values resulting from the application of the subsequent selected voltage may be read out from a subsequent row of pixels in pixel array 50. If desired, steps 134 and 136 may be repeated (as indicated by arrow 138) until verification image signal values have been read out from all rows of pixels in pixel array 50.

Various embodiments have been described illustrating an imaging and response system (see, e.g., system 100 of FIG. 1) including an imaging system and host subsystems. An imaging system may include one or more image sensors. Each image sensor may be associated with one or more lenses and one or more mechanical shutters. Each image sensor may include an array of image pixels formed on a substrate. Each image pixel may include one or more photosensitive elements configured to convert incoming light into electric charges.

Each image sensor may include verification circuitry for applying a verification voltage to a power supply network of the image pixel array. Verification circuitry may include one or more switchable power supply contacts or a controllable, variable voltage supply. Verification circuitry may be configured to apply a voltage drop across power supply circuitry of a pixel array in order to generate a verification image signal gradient across the pixels of the pixel array. Verification circuitry may apply the voltage drop during verification operations by coupling a first voltage supply contact to a first voltage and coupling a second voltage supply contact to a second voltage that is different from the first voltage. During normal operations (e.g., image operations) of the imaging system, in configurations in which the power supply circuitry of a pixel array is coupled to two voltage supply contacts, both voltage supply contacts may be coupled to a common power supply voltage for the pixel array.

In another example, verification circuitry may include a controllable, variable voltage supply coupled to the power supply circuitry of a pixel array. During verification operations, a different voltage may be applied to each pixel row just before that pixel row is read out. In this way, verification image data may be generated in which rows of pixels receive different verification image signals without generating a current in the power supply circuitry of the pixel array.

An image sensor may include control circuitry formed on the substrate that is configured to operate the image pixels and the verification circuitry. An image sensor may have multiple operational modes. For example, in one operational mode (e.g., an imaging mode of operation) the control circuitry may operate the image sensor to capture images of a scene using the image pixels. In another operational mode (e.g., a verification mode of operation), the control circuitry may operate the verification circuitry and the image pixels to capture verification image data.

The imaging and response system may include a host subsystem coupled to the imaging system. The imaging system and the host subsystem may each include storage and processing circuitry. Storage and processing circuitry associated with the imaging system and/or the host subsystem may process and store image data, verification image data, predetermined standard data (also sometimes referred to as verification-standard data) or other data. The host subsystem may be configured to generate a response (e.g., to actively brake an automobile, to activate an audible or visible warning signal, etc.) based on scene content in images that have been received from the imaging system.

The processing circuitry of the imaging system may be configured to perform a comparison of the verification image data to the verification-standard data to verify proper operation of the imaging system. The host subsystem may be configured to receive a result of the comparison of the verification image data to the verification-standard data. A host subsystem may be a portion of a vehicle safety system such as an active control system that is configured to redirect the automobile to avoid a collision with an object in the images.

During operation of the imaging system, image frames may be captured and provided to the host subsystem. Verification image data may be occasionally collected by the imaging system during operation of the imaging system (e.g., between image frames, after a selected number of image frames, during an image frame or at any other suitable interval).

The verification image data may be compared with a predetermined standard stored on the storage and processing circuitry. The result of the comparison may then be provided to external circuitry such as the host subsystem. Based on the result of the comparison of the verification image data with the predetermined standard, external circuitry such as the host subsystem may continue normal operation of the imaging system (e.g., if the result is within an acceptable range), generating a warning signal (e.g., if a fault signal is generated with the result because the result is outside of an acceptable range), disable the imaging system (e.g., if the result indicates a significant problem with the imaging system), or may take other appropriate action based on the result.

The foregoing is merely illustrative of the principles of this invention which can be practiced in other embodiments.

What is claimed is:

1. An image sensor, comprising:
  an array of image pixels, wherein each image pixel includes a photosensitive element configured to convert incoming light into electric charges;
  power supply paths coupled to the image pixels;
  a first voltage supply contact coupled to the power supply paths; and
  a second voltage supply contact coupled to the power supply paths, wherein the first voltage supply contact is operable to supply a first supply voltage and wherein the second voltage supply contact is operable to supply, in a first mode, the first supply voltage and operable to supply, in a second mode, a second supply voltage that is different from the first supply voltage while the first supply voltage is supplied by the first voltage supply contact so that a voltage gradient is generated on the array of image pixels.

2. The image sensor defined in claim 1 wherein each of the image pixels has a source-follower transistor operable to receive the first supply voltage in the first mode and wherein the first supply voltage is a positive power supply voltage for the image pixels.

3. The image sensor defined in claim 1 wherein each of the image pixels has a source-follower transistor operable to receive the first supply voltage, in the first mode, wherein the first supply voltage is a positive power supply voltage for the image pixels, and wherein the second voltage is a ground supply voltage.

4. The image sensor defined in claim 3 wherein the second voltage supply contact includes a multiplexer configured to switchably couple the second voltage supply contact to the positive power supply voltage, in the first mode, and the ground supply voltage, in the second mode.

5. The image sensor defined in claim 3 wherein the first mode comprises an imaging operation and, during the imaging operation, the second voltage supply contact is coupled to the positive power supply voltage, and wherein the second mode comprises a verification mode of operation and, during the verification mode of operation, the second voltage supply contact is coupled to the ground supply voltage.

6. The image sensor defined in claim 5 wherein the first voltage supply contact is connected to a first location on the power supply paths, wherein the second voltage supply contact is connected to a second location on the power supply paths, and wherein the first and second locations are disposed on opposing corners of the array of image pixels.

7. An image sensor, comprising:
an array of image pixels, wherein each image pixel includes a photosensitive element configured to convert incoming light into electric charges;
power supply paths coupled to the image pixels; and
a controllable voltage supply circuit coupled to the power supply paths, wherein, during imaging operations, the controllable voltage supply circuit is configured to provide a power supply voltage to the power supply paths and wherein, during a verification mode of operation, the controllable voltage supply circuit is configured to provide, at a plurality of different times, a corresponding plurality of additional voltages to the entire array of image pixels through the power supply paths;
further comprising control circuitry, wherein the control circuitry is configured to operate the image pixels and the controllable voltage supply circuit; wherein, during the verification mode of operation, the control circuitry is configured to read out a first row of image pixels while the controllable voltage supply circuit provides a first one of the plurality of additional voltages to the power supply paths and wherein the control circuitry is configured to readout a second row of image pixels while the controllable voltage supply circuit provides a second one of the plurality of additional voltages to the power supply paths.

8. A method of operating an imaging system having at least one image sensor that includes image pixels and verification circuitry coupled to a power supply network, comprising:
with the verification circuitry, applying a first voltage to a first location on the power supply network;
with the verification circuitry, while the first voltage is applied to the first location on the power supply network, applying a second voltage to a second location on the power supply network, wherein the second voltage is different from the first voltage, and wherein applying the first and second voltages to the power supply network generates a voltage gradient across the image pixels; and
with the image pixels, capturing verification image data while the first and second voltages are applied to the power supply network.

9. The method defined in claim 8 wherein the at least one image sensor further comprises control circuitry and wherein the imaging system further comprises storage and processing circuitry, the method further comprising:

with the control circuitry, reading out the verification image data from the image pixels to the storage and processing circuitry; and
with the storage and processing circuitry, comparing the verification image data with predetermined standard data stored on the storage and processing circuitry.

10. The method defined in claim 9, further comprising:
with the storage and processing circuitry, providing a result of the comparison of the verification image data with the predetermined standard to external circuitry.

11. The method defined in claim 10, further comprising:
with the verification circuitry and during imaging operations, applying the first voltage to the second location on the power supply network;
with the image pixels, capturing at least one image while the first voltage is applied to the first and second locations on the power supply network; and
providing the at least one image to the external circuitry.

12. The method defined in claim 11, further comprising:
with the control circuitry, while the first voltage is applied to the first location on the power supply network and while the second voltage is applied to the second location on the power supply network, operating a transfer transistor and a reset transistor associated with each image pixel.

13. The method defined in claim 12 wherein capturing the verification image data while the first and second voltages are applied to the power supply network comprises capturing the verification image data during a vertical blanking period.

14. A method of operating an imaging system having at least one image sensor that includes control circuitry and a power supply network for an image pixel array and verification circuitry, comprising:
with the verification circuitry, supplying a first voltage to the entire power supply network;
with the control circuitry, reading out verification image data for a given verification image from a first row of image pixels while the first voltage is supplied to the entire power supply network;
with the verification circuitry, supplying a second voltage that is different from the first voltage to the entire power supply network; and
with the control circuitry, reading out verification image data for the given verification image from a second row of image pixels while the second voltage is supplied to the entire power supply network.

15. The method defined in claim 14, further comprising:
with the verification circuitry, supplying a plurality of additional voltages to the entire power supply network; and
with the control circuitry, reading out verification image data for the given verification image from each of a plurality of additional rows of image pixels while a respective one of the plurality of additional voltages is supplied to the entire power supply network.

16. The method defined in claim 15, further comprising:
with the verification circuitry and during imaging operations, providing a power supply voltage to the power supply network;
with the image pixels, capturing at least one image frame while the power supply voltage is provided to the power supply network; and
providing the at least one image frame to external circuitry.

17. The method defined in claim 16, further comprising:
with the external circuitry, generating a response based on scene content in the at least one image frame.

18. The method defined in claim 17 wherein the imaging system further comprises storage and processing circuitry, the method further comprising:
- with the storage and processing circuitry, comparing the verification image to predetermined standard data stored on the storage and processing circuitry; and
- providing a result of the comparison of the verification image to the predetermined standard to the external circuitry.

* * * * *